March 25, 1924.

P. W. CAMERON

KITCHEN UTENSIL

Filed April 4, 1923

1,487,917

Inventor
P. W. Cameron
By Watson E. Coleman
Attorney

Patented Mar. 25, 1924.

1,487,917

UNITED STATES PATENT OFFICE.

PERLEY W. CAMERON, OF WEST HAVEN, CONNECTICUT.

KITCHEN UTENSIL.

Application filed April 4, 1923. Serial No. 629,889.

*To all whom it may concern:*

Be it known that I, PERLEY W. CAMERON, a citizen of the United States, residing at West Haven, in the county of New Haven and State of Connecticut, have invented certain new and useful Improvements in Kitchen Utensils, of which the following is a specification, reference being had to the accompanying drawings.

This invention relates to kitchen utensils and more particularly to a utensil lid lifter.

An important object of the invention is to provide a device of this character which is engageable with either a round or oval knob or with the wire loops with which such utensil covers are sometimes provided.

A further object of the invention is to provide a device of this character which may be engaged with and disengaged from the utensil cover handle by the use of one hand and which when engaged with the utensil cover may be employed either to hold the utensil cover in position, while pouring off water from the cooking vessel to drain the contents thereof, or to remove the same.

A still further object of the invention is to provide a device of this character which is capable of many other uses than that of removing and replacing or holding utensil covers, as for example, for lifting the lid covers of stoves, drawing articles from an oven or the like.

These and other objects I attain by the construction shown in the accompanying drawings, wherein for the purpose of illustration is shown a preferred embodiment of my invention and wherein:—

Referring now more particularly to the drawings, the numeral 10 indicates an elongated handle to which are secured a plurality of spring fingers 11. These spring fingers 11 are arcuately curved and have the lower ends thereof spaced and provided with outturned end portions 12 disposed at an acute angle to the axis of the handle 10, the juncture of the outturned end portions with the fingers being in the form of a curve, as indicated at 13.

Figure 1:
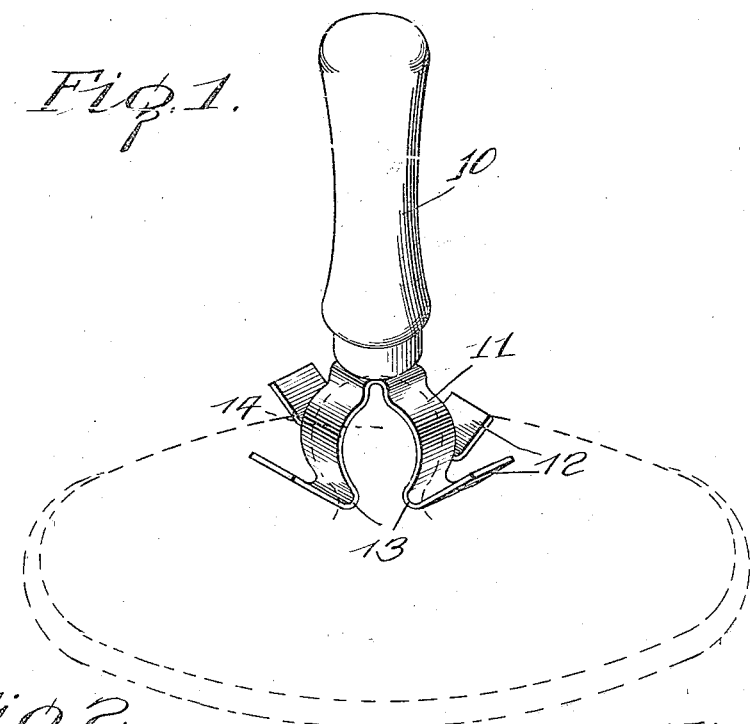
Figure 1 is a perspective view of kitchen utensil constructed in accordance with my invention applied to a pan lid, the pan lid being indicated in dotted lines.
Figure 2:
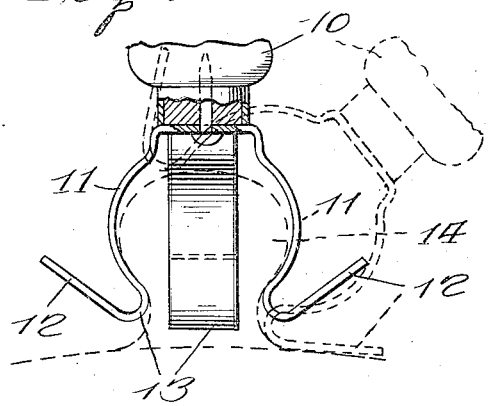
Figure 2 is a fragmentary sectional view, the manner of disengaging the utensil from pan cover being indicated in dotted lines.

In the use of the device for removing or holding the cover of a utensil, the cover having a knob 14, the ends of the spring fingers are engaged with the upper surface of the knob and handle portion forced toward the cover, with the result that these fingers yield to permit their passage over the knob until they pass the point of greatest circumference thereof, at which time they will spring inwardly against the sides of the knob holding the auxiliary handle firmly upon the cover. With the auxiliary handle in this position the cover may either be held in position by forcing the same against the pan or may be removed as desired. Attention is directed to the fact that when holding the cover by the use of the handle, as described, the hand is spaced from the cover and accordingly steam escaping from the vessel, when draining the same, will not come into engagement with the hand. When it is desired to remove the handle from the knob this may be accomplished by simply employing one of the outward extensions 12 as a fulcrum and moving the handle in the vertical plane of the fulcrum and toward the fulcrum, with the result that the angular portion 12 employed serves to hold the cover in position upon the vessel while the other fingers spread to release from the knob, this operation being indicated in dotted lines in Figure 2 of the drawings.

Figure 3:
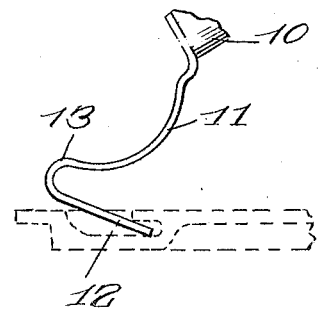
Figure 3 is a fragmentary side elevation showing the device in use as a stove lid lifted.

The angular portions 12 in addition to serving as a fulcrum in removing the handle from a knob likewise serve many other functions and may be employed, as hooks for shifting utensils within an oven or any one thereof may be engaged in the lifter opening of a stove lid, as indicated in Figure 3 and the devices employed for lifting the stove lids. In using the device with covers having a wire finger loop, one of these hooks may be engaged through the finger loop to lift the cover or this engagement may be employed to prevent shifting of the cover while the auxiliary handle is employed to hold the cover in position during draining of the contents of the vessel.

In the foregoing it is believed to be obvious that a kitchen utensil constructed in accordance with my invention is capable of a wide range of use and at the same time may be very inexpensively produced. It will furthermore be obvious that the construction of the same may be varied as to size and arrangement and I accordingly do not limit myself to such specific structure as hereinbefore set forth except as hereinafter claimed.

I claim:—

A kitchen utensil, comprising a handle provided at one end with a plurality of longitudinally extending arcuately curved resilient fingers, the free ends of the fingers being spaced and provided with outwardly directed angular extensions disposed at an acute angle to the handle.

In testimony whereof I hereunto affix my signature.

PERLEY W. CAMERON.